United States Patent
Boe

(10) Patent No.: US 9,531,182 B2
(45) Date of Patent: Dec. 27, 2016

(54) ENERGIZING SYSTEM AND METHOD

(71) Applicant: Ove Boe, Tanem (NO)

(72) Inventor: Ove Boe, Tanem (NO)

(73) Assignee: Siemens Aktiengesellschaft, München (DE)

( * ) Notice: Subject to any disclaimer, the term of this patent is extended or adjusted under 35 U.S.C. 154(b) by 31 days.

(21) Appl. No.: 14/433,676

(22) PCT Filed: Oct. 2, 2013

(86) PCT No.: PCT/EP2013/070558
§ 371 (c)(1),
(2) Date: Apr. 5, 2015

(87) PCT Pub. No.: WO2014/053552
PCT Pub. Date: Apr. 10, 2014

(65) Prior Publication Data
US 2015/0333500 A1  Nov. 19, 2015

(30) Foreign Application Priority Data
Oct. 5, 2012 (EP) .................................... 12187438

(51) Int. Cl.
*H02H 3/00* (2006.01)
*H02H 3/20* (2006.01)
*H02J 3/18* (2006.01)

(52) U.S. Cl.
CPC ............... *H02H 3/20* (2013.01); *H02H 3/003* (2013.01); *H02J 3/18* (2013.01); *Y02E 40/12* (2013.01); *Y02E 40/30* (2013.01)

(58) Field of Classification Search
USPC ........................ 361/62; 363/35, 37
See application file for complete search history.

(56) References Cited

U.S. PATENT DOCUMENTS 4,529,926 A  7/1985  Takada
6,411,067 B1 * 6/2002  Bjorklund ............. H02J 3/1814
                                                    323/207
(Continued)

FOREIGN PATENT DOCUMENTS

EP         2634886 A1    9/2013
WO    WO2009127732 A1   10/2009

OTHER PUBLICATIONS

European Search Report for related European Application No. 12187438.2-1806, mailed Feb. 12, 2014.
(Continued)

*Primary Examiner* — Danny Nguyen
(74) *Attorney, Agent, or Firm* — Lempia Summerfield Katz LLC

(57) ABSTRACT

An energizing system for energizing an electric power transmission cable (60) is provided. The electric power transmission cable (60) has an input side (65) coupled to an electric power source (61) and an output side (66) coupled to a load (621). The energizing system includes a first switch (10) connected between the power source (61) and the input side (65) of the power transmission cable (60) to connect and disconnect the power source (61) from the power transmission cable (60). A reactive power compensation unit (50) is further provided for compensating reactive power generated by at least one of the power transmission cable (60) or the load (62). A second switch and a third switch are provided for connecting the reactive power compensation unit (50) in parallel to the first switch (10) or the load (62).

20 Claims, 4 Drawing Sheets

(56) References Cited

U.S. PATENT DOCUMENTS

2010/0001698 A1 1/2010 Johnson
2012/0267955 A1* 10/2012 Zhan .......................... H02J 1/06
307/31

OTHER PUBLICATIONS

European Search Report for related European Application No. 12187438.2-1806/2717407, mailed Jun. 10, 2014.
PCT International Search Report and Written Opinion of the International Searching Authority dated Aug. 8, 2014 for corresponding PCT/EP2013/070558.
PCT International Search Report and Written Opinion of the International Searching Authority dated Dec. 12, 2014 for corresponding PCT/EP2013/070558.
PCT International Search Report and Written Opinion of the International Searching Authority dated Oct. 7, 2014 for corresponding PCT/EP2013/070558.

* cited by examiner

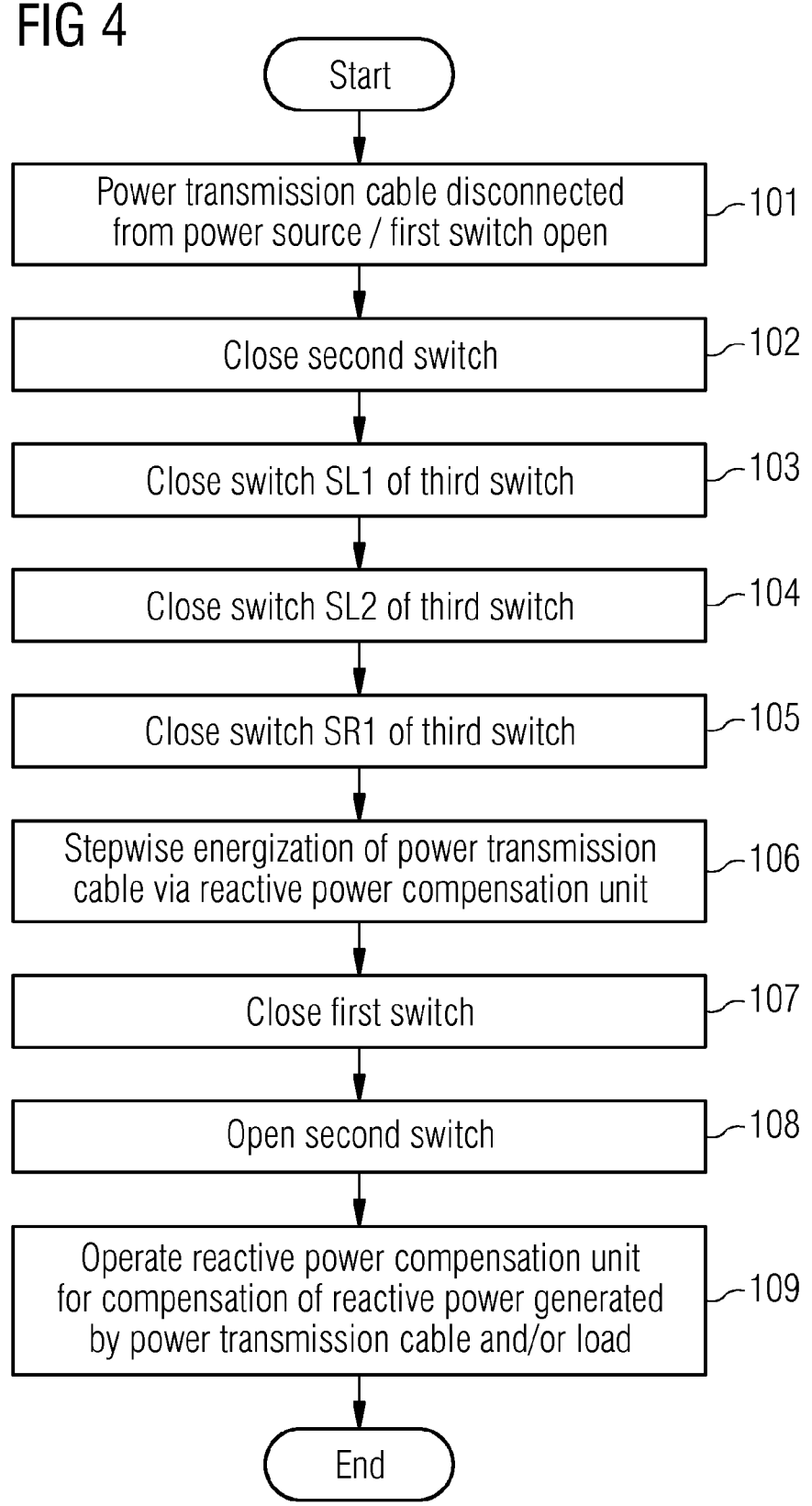

ENERGIZING SYSTEM AND METHOD

The present patent document is a §371 nationalization of PCT Application Serial Number PCT/EP2013/070558, filed Oct. 2, 2013, designating the United States, which is hereby incorporated by reference. This patent document also claims the benefit of EP 12187438.2, filed Oct. 5, 2012, which is also hereby incorporated by reference.

FIELD

The present embodiments relate to an energizing system for energizing an electric power transmission cable and to an energizing method.

BACKGROUND

Due to the increasing energy demands, offshore oil and gas production is moving into deeper waters. For providing an efficient and secure production, processing facilities are being installed at the ocean floor. Such subsea installations may include a range of components, including pumps, compressors, and the like as well as a power grid for operating the components. The power grid may, for example, include a subsea transformer, subsea switchgear, and subsea variable speed drives. The components of the subsea installation are to be protected from the surrounding sea water, in which pressures of 300 bar or more may prevail (at installation depths of 3,000 m or more).

Electrical power may be provided to the subsea installation from a top side installation, such as a fixed or floating offshore platform or vessel, or an onshore side. The electric connection to the top side power source may be provided by an electric power transmission cable that may be included in an umbilical or may be provided as a subsea power cable. This way, AC electric power may, for example, be transmitted over several kilometers, and in some installations over even more than 100 kilometers.

When such electric power transmission cable is connected to a voltage source, the impedance of the cable may cause reflections and over-voltages within the cable or in equipment connected to the far end of the cable (e.g., in subsea devices).

In some installations, a transformer may be connected to the far end of the cable, which may result in increased over-voltages or reflections, and which may cause an even bigger challenge in designing such power transmission system.

To prevent that such over-voltages and reflections cause any problems, it is known to design the components of such power system with sufficient over-voltage capability. Accordingly, the power transmission cable and the subsea transformer and other components may be configured to handle such reflections and over-voltages. However, designing the equipment for higher voltages generally leads to an increased size and weight of the components, and also, such components will be considerably more expensive. The costs for transportation of such subsea components on a vessel increase with required space and weight are generally very high, so that it is desirable to keep these subsea components as small and lightweight as possible. It is also desirable to keep the power system simple, since an increase in complexity would lead to additional costs and would also render the system more prone to failures.

SUMMARY AND DESCRIPTION

The present embodiments may obviate one or more of the drawbacks or limitations in the related art. For example, start up of a system for transmitting electric power is improved.

According to an embodiment, an energizing system for energizing an electric power transmission cable having an input side coupled to electric power source and an output side coupled to a load is provided. The energizing system includes a first switch connected between the power source and the input side of the power transmission cable. The first switch is switchable to connect and disconnect the power source from the power transmission cable. A reactive power compensation unit is provided for compensating reactive power generated by at least one of the power transmission cable or the load. The reactive power compensation unit is coupled to the input side of the power transmission cable. The energizing system further includes a second switch connected between the input side of the power transmission cable and the reactive power compensation unit, and a third switch connected between the power source and the reactive power compensation unit. The second switch and the third switch are connected such that by closing the second switch and the third switch, the reactive power compensation unit is connected in series with the power transmission cable and is connected in parallel to the first switch. The connection is such that when the first switch is opened, the power transmission cable is energizable via the third switch, the reactive power compensation unit, and the second switch.

In such a configuration, when the second and third switch are closed, the first switch may be effectively bypassed, so that the power transmission cable may be energized through the series connection with the reactive power compensation unit, which may act as a series impedance. This way, the energizing may be performed relatively slow, and reflections and over-voltages may be damped efficiently. Since reflections and over-voltages may be reduced or even be prevented, the power transmission cable as well as the load may be specified for a lower voltage, thereby making these components less costly and more compact in size and weight. Since the reactive power compensation unit is used for energizing the electric power transmission cable, the system may remain relatively simple, since such unit may already be provided for compensating reactive power.

In an embodiment, the second switch or the third switch may be switchable to connect the reactive power compensation unit in parallel with the load for compensating reactive power in operation. In operation, the first switch may be closed, so as to provide an essentially direct connection between the power source and the power transmission cable. The second switch or the third switch may now be connected to the reactive power compensation unit such that by closing the respective switch, the reactive power compensation unit is connected to the power source in parallel to the power transmission cable and to the load so as to be operable to compensate reactive power. Using the switches, the reactive power compensation unit may thus be used both for energizing the power transmission cable and for reactive power compensation.

The power transmission cable may be a subsea power cable, or the power transmission cable may be part of an umbilical. The power source, the electric power transmission cable, and the load may be considered part of a power system.

In an embodiment, the reactive power compensation unit includes a reactive power compensator including at least an inductance (e.g., a coil) and a resistance. The inductance and the resistance are connected in parallel between the third switch and the second switch. The power transmission cable is energizable via the inductance and the resistance. For example, the configuration may be such that when the second and third switches are closed, each of the inductance and the resistance are connected in series with the power transmission cable. When the first switch is closed and either the second or the third switch is open, the inductance and resistance may be configured to provide reactive power compensation.

The reactive power compensator may, for example, include a first inductance, a second inductance and a resistance, which all are connected in parallel between the third switch and the second switch.

The second switch or the third switch may include a switch for each inductance and a switch for the resistance. The switches may be connected so that the at least one inductance and the resistance are independently connectable between the power source and the power transmission cable by the second or third switch. As an example, if two inductances and a single resistance are provided in the reactive power compensator, the third switch may, for example, include three switches for individually switching these three components. By appropriately switching the respective switches of the second or the third switch, a stepwise increase of current fed into the power transmission cable may be achieved.

In an embodiment, the energizing system is a three-phase system, and the power transmission cable is adapted to transmit three-phase electric power. The reactive power compensation unit may be three-phase reactive power compensation unit.

Accordingly, each of the first, the second and the third switches may include a switch for each phase of the electric power. All three phases of the electric power transmission cable may thus be energized via the three-phase reactive power compensation unit.

In such configurations, the reactive power compensator may include at least one inductance and a resistance for each of the three phases. Accordingly, if one inductance and one resistance are provided for each phase, the second or the third switch may include 3×2=six switches. If two independently switchable inductances and a resistance are provided, the second or the third switch may include 3×3=nine switches.

In an embodiment, the second switch or the third switch may be switchable to connect the reactive power compensation unit in parallel to the load for compensating reactive power in operation, while the other of the second switch or the third switch remains open. The energizing system may further include a fourth switch connected to the side of the three-phase reactive power compensation unit at which the second or the third switch remains open during reactive power compensation. The fourth switch is switchable to connect the three-phases into a star or delta configuration. In a three-phase configuration of the energizing system, the fourth switch may thus support the changeover from the reactive power compensation unit being used for energizing the power transmission cable and for being used for reactive power compensation.

In an embodiment, the reactive power compensation unit may include a Volt Ampere Reactive (VAR) compensator (e.g., a static VAR compensator (SVC) or a static synchronous compensator). Such VAR compensator may be particularly effective in compensating reactive power generated by the power transmission cable and/or the load.

The VAR compensator (e.g., the static synchronous compensator) may be via the second switch connectable parallel to the load for compensating reactive power. The reactive power compensation unit may further include a rectifier connectable via the third switch to the power source. The VAR compensator may have a DC side connected to the output of the rectifier. A relatively simple configuration may thus be provided in which the VAR compensator may be used for energizing the power transmission cable. As an example, at start up, energizing is performed via the rectifier and the VAR compensator (e.g., first switch open), where operation is switched over to VAR compensation by closing the first switch and opening the third switch.

In an embodiment, the reactive power compensation unit may include a first reactive power compensator and a second reactive power compensator. The second switch and the third switch may include switches to independently connect or disconnect the first reactive power compensator and the second reactive compensator in parallel to the first switch. As an example, in a three-phase system, the second and the third switch may each include at least 2×3=six switches.

The first reactive power compensator may include at least a first inductance, a second inductance, and a resistance connected in parallel. The second reactive power compensator may include a static VAR compensator. In such configuration, effective reactive power compensation may be achieved, while at the same time, the first and the second reactive power compensators may be used in isolation or in combination for pre-energizing the power transmission cable. By appropriately switching the respective switches of the second and the third switches, a stepwise increase of current fed into the power transmission cable may be achieved. Each of the first and second reactive power compensators may provide a series impedance that is in series with the power transmission cable during start up.

The first and the second inductance and the resistance of the first reactive power compensator may be individually switchable as mentioned above, so that in a three-phase system, the third switch may, for example, include 3×3+3=twelve individual switches. Other configurations may also be provided.

In a further embodiment, the energizing systems may include a control unit for automatically controlling the first, the second, and the third switch. An automatic change-over from a startup phase in which the power transmission cable is energized via the reactive power compensation unit to an operating phase in which reactive power compensation is performed may be achieved.

The switches may, for example, be breakers (e.g., circuit breakers).

A further embodiment provides a subsea power system including a topside power source, a subsea transformer, a power transmission cable electrically connecting the topside power source to the subsea transformer, and an energizing system. The energizing system may be configured in accordance with any of the above described embodiments. The energizing system is provided for energizing the power transmission cable during startup of the subsea power system. The power transmission cable may, for example, be a subsea cable, or may be an umbilical or the like. The topside power source may be provided on a fixed or floating platform or vessel, such as on a semi submersible platform or on a production vessel, or may be provided at an onshore site.

A further embodiment provides a method of energizing, by an energizing system, an electric power transmission cable having an input side coupled to an electric power source at an output side coupled to a load. The energizing system has a first switch connected between the power source and the input side of the power transmission cable, a reactive power compensation unit for compensating reactive power generated by at least one of the power transmission cable or the load. The reactive power compensation unit is coupled to the input side of the power transmission cable, a second switch connected between the input side of the power transmission cable and the reactive power compensation unit, and the third switch connected between the power source and the reactive power compensation unit. The method includes: operating the first switch in an open position; closing the second and the third switches, thereby connecting the reactive power compensation unit in parallel to the first switch so as to bypass the open first switch; energizing the power transmission cable through the reactive power compensation unit; closing the first switch; opening one of the second switch or the third switch; and operating the reactive power compensation unit so as to compensated reactive power generated by at least one of the power transmission cable or the load. By such method, a smooth startup of the power system, in which reflections and over-voltages in the power transmission cable may be prevented, may be achieved. A smooth transmission from a startup phase to a operating phase of the power system may be provided by such method.

In an embodiment, the reactive power compensation unit includes at least a first reactive power compensator including at least one inductance and a resistance. The third switch includes switches for independently switching each of the at least one inductance and the resistance. The act of closing the second and the third switches includes closing the second switch and closing a switch of the third switch that is connected to the at least one inductance so as to connect the inductance in parallel to the first switch. After a predetermined amount of time, another switch of the third switch that is connected to the resistance is closed so as to connect the resistance in parallel with the first switch (and with the inductance). This way, a stepwise increase of the current that is fed into the power transmission cable may be achieved.

The at least one inductance may in some embodiments include at least two inductances. These may again be stepwise connected in parallel to the first switch during the startup period to achieve a stepwise increase of the current. The method may, for example, include the additional act of closing a switch of the third switch that is connected to the other inductance so as to connect the other inductance in parallel to the first switch. As an example, a first inductance, a second inductance, and the resistance may, in this order, be connected in parallel to the first switch during the startup phase of the power system. By having one or two inductances and a resistance connected in parallel that are individually switchable, a smooth start-up of the power system may be achieved.

The method may be performed by an energizing system configured in accordance with any of the above outlined embodiments.

The features of the embodiments mentioned above and yet to be explained below may be combined with each other unless noted to the contrary.

BRIEF DESCRIPTION OF THE DRAWINGS

In the drawings, like reference numerals refer to like elements.

FIG. 4 is a flow diagram illustrating a method according to an embodiment.

DETAILED DESCRIPTION

Figure 1:
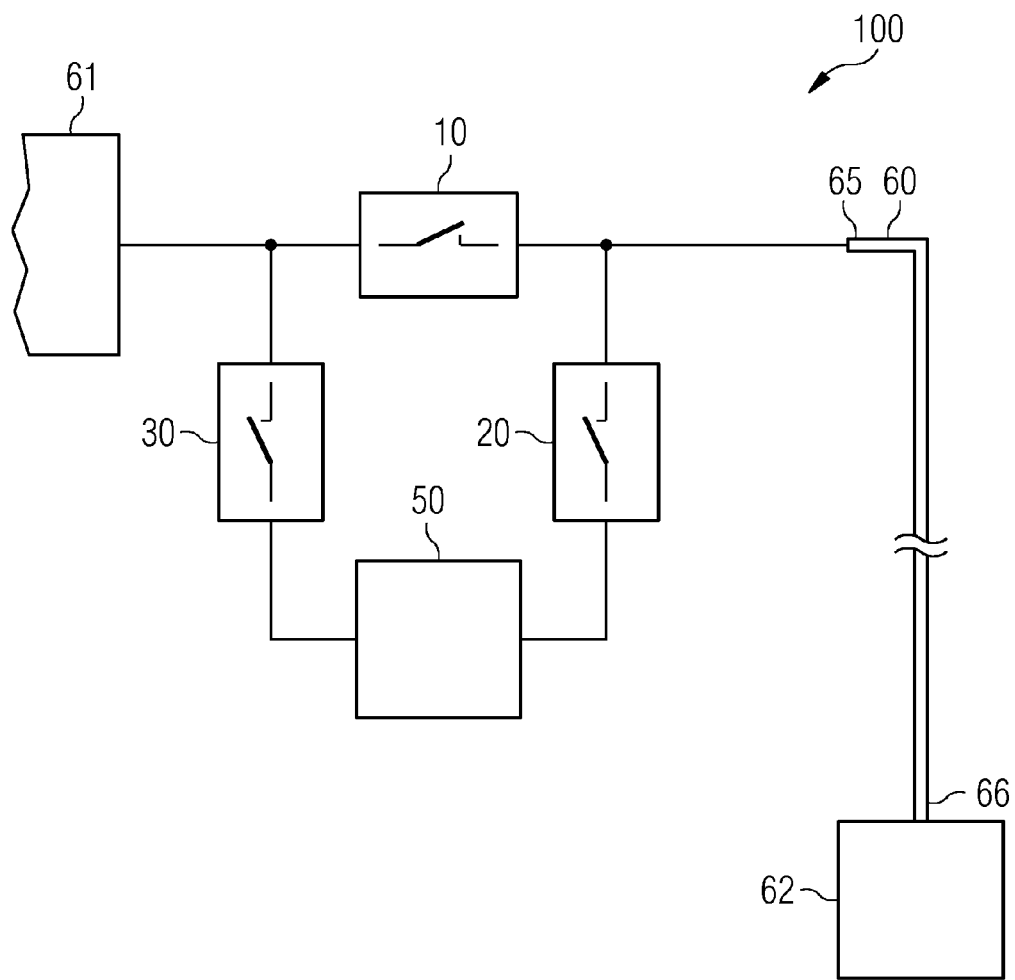
FIG. 1 is a schematic diagram showing an energizing system for energizing an electric power transmission cable according to an embodiment.

In the following, the embodiments illustrated in the accompanying drawings are described in more detail. The following description is only illustrative and non-restrictive. The drawings are only schematic representations, and elements in the drawings are not necessarily to scale with each other.

The coupling of physical or functional units as shown in the drawings and described hereinafter does not need to be a direct connection or coupling, but may also be an indirect connectional or coupling (e.g., a connection or a coupling with one or more additional intervening elements, such as fuses, circuit breakers, transformers or the like). A skilled person will understand that the physical or functional units illustrated and described herein with respect to the different embodiments do not need to be implemented as physically separate units. One or more physical or functional blocks or units may be implemented in a common circuit, chip, circuit element or unit, while other physical or functional blocks or units shown may be implemented in separate circuits, chips, circuit element or units.

FIG. 1 is a schematic diagram showing an energizing system 100 according to an embodiment. The energizing system is connected to a power source 61, which may, for example, include a generator, such as an alternating current (AC) generator coupled to a diesel engine or gas turbine, or the connection may be to a power grid or the like. A power transmission cable 60, which may, for example, be an umbilical from a topside installation (e.g., on a fixed or floating platform or vessel) to a subsea installation, or a subsea power transmission cable running from an onshore site to a subsea installation, is coupled to the power source 61 via the energizing system 100. The power transmission cable 60 transmits electric power from power source 61 to a load 62. The load 62 is a subsea device of a subsea installation, such as a subsea transformer. Accordingly, the power transmission cable 60 may run from the power source 61 over several kilometers, or even tens of kilometers towards the load 62. The power transmission cable 60 may thus have a considerable capacitance, which may lead to reflections and over-voltages upon energizing the power transmission cable 60 (e.g., upon application of AC voltage to the power transmission cable 60).

The components 60, 61, 62 and 100 form a subsea power system that provides an electric power to a subsea location.

The energizing system 100 is configured to reduce or prevent such over-voltages and reflections. Energizing system 100 includes a first switch 10 that is connected between an input side 65 of the power transmission cable 60 and the power source 61. First switch 10 may be closed and opened to connect or disconnect the power transmission cable 60 from the power source 61. First switch 10 provides a direct connection from the power source 61 to the power transmission cable 60 via which AC electric power is transmitted during normal operation of the power system.

For providing a relatively smooth energization of the power transmission cable 60, the energizing system 100 includes a second switch 20, a third switch 30, and a reactive power compensation unit 50. Reactive power compensation unit 50 is a unit that in normal operation of the subsea power system compensates reactive power generated by the power transmission cable 60 and/or the load 62. For this purpose, the reactive power compensation unit 50 is connected to the power source 61 in parallel to the power transmission cable 60 and the load 62 during normal operation. In the system of FIG. 1, this may be achieved by closing either one of the switches 20 or 30, depending on the particular configuration of unit 50. Unit 50 is thus coupled to the input side 65 of the power transmission cable 60, either via the second switch 20 or via the first and third switches 10, 30. Unit 50 may, for example, include inductive and resistive elements; the unit 50 may also include a volt ampere reactive (VAR) compensator (e.g., a static VAR compensator (SVC) or static synchronous compensator).

Second and third switches 20, 30 are connected such that the reactive power compensation unit 50 is connected in parallel to the first switch 10. For example, the second switch 20 is connected between the input side 65 of power transmission cable 60 and the reactive power compensation unit 50. Third switch 30 is connected between the power source 61 and the reactive power compensation unit 50. Accordingly, if both switches 20, 30 are closed, the reactive power compensation unit 50 is connected in parallel to the first switch 10. When the first switch 10 is opened, the first switch 10 may effectively be bypassed via the third switch 30, the reactive power compensation unit 50, and the second switch 20.

The energizing system 100 is configured such that for energizing the power transmission cable 60, the first switch 10 is opened and is bypassed via the reactive power compensation unit 50. The reactive power compensation unit 50 is thus effectively being used as a series impedance that is connected in series with the power transmission cable 60 during the start-up phase of the power system. For example, a current inrush into the power transmission cable 60 may be reduced by the series impedance constituted by reactive power compensation unit 50. The second or third switches 20, 30 and the reactive power compensation unit 50 may be configured such that a stepwise increase of the current, which is supplied to the power transmission cable 60, may be achieved. This is described in more detail hereinafter with respect to FIGS. 2 and 3.

The switches 10, 20 and 30 may be controlled automatically by a control unit (not shown). Such control unit may, for example, automatically run a start-up sequence upon powering up the power system, which closes and opens the respective switches, as described above in a predetermined sequence. In other embodiments, manual controls maybe provided, for example, in a control center, for opening and closing the switches 10, 20 and 30.

The reactive power compensation unit 50 may be provided to handle reactive power generated by the relatively long power transmission cable 60, in order to provide that a power factor relatively close to one may be achieved. Accordingly, most power systems will already include a reactive power compensation unit 50. Using the energizing system 100, the reactive power compensation unit 50 may also be used in a start-up phase of the power system for limiting the inrush currents. Accordingly, the additional complexity introduced by the energizing system 100 is relatively low, while at a same time, a smooth powering up of the power system may be achieved, and reflections and over-voltages in the power transmission cable 60 and in connected equipment may be reduced or even prevented. In consequence, the power transmission of cable 60 and the connected components do not need to be designed to handle such over-voltages, and the necessary level of insulation may, for example, be reduced. Also, stress on the components during the start-up sequence may be reduced to a significant extent, increasing the lifetime of the components.

Figure 2:
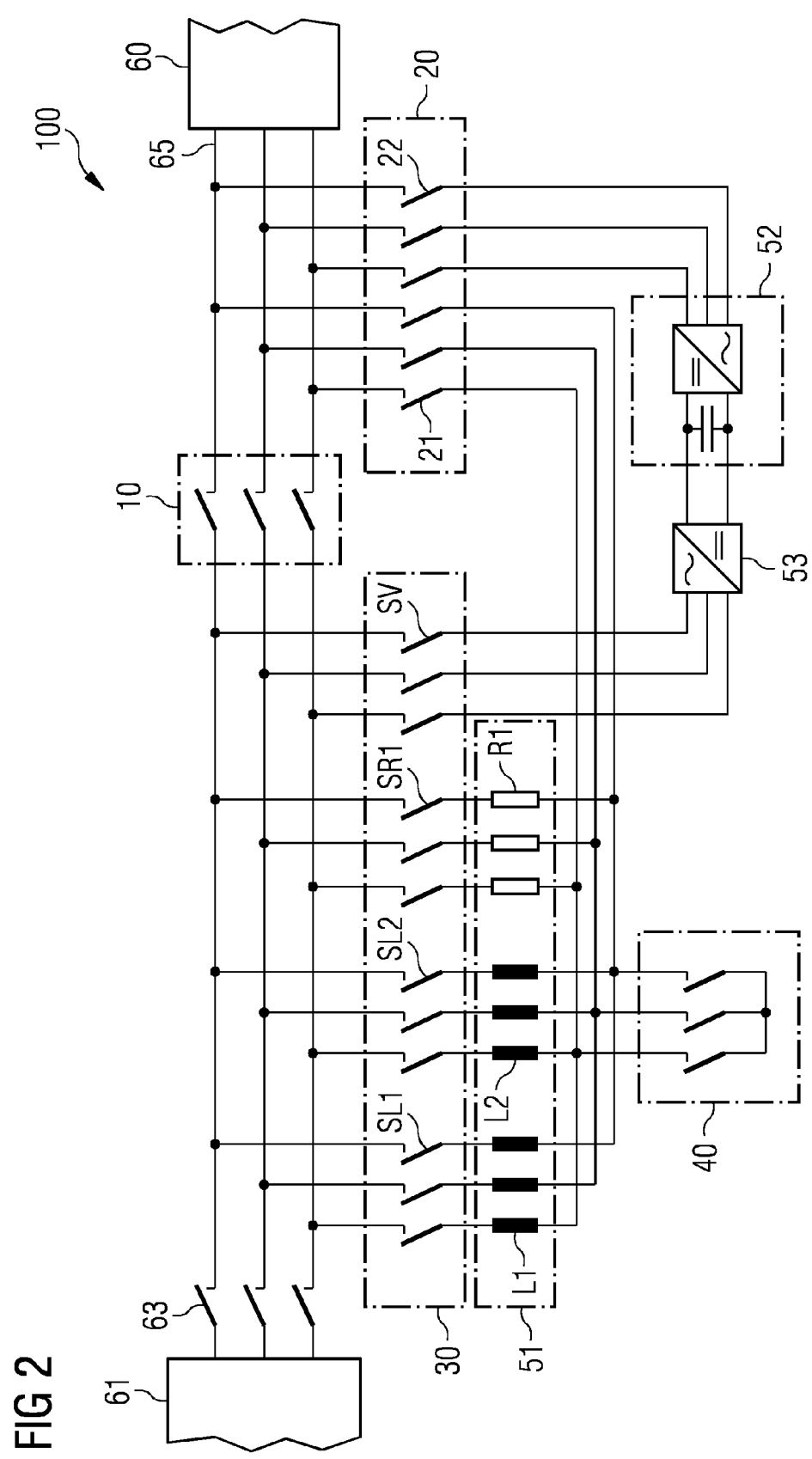
FIG. 2 is a schematic diagram showing an implementation of the energizing system of FIG. 1 in more detail.

The power system 100 may be a three-phase-power system, as illustrated in FIG. 2. The above-described functions may thus be performed for each phase of the power system 100. Accordingly, each of the switches 10, 20 and 30 includes at least one switch for each phase of electric power.

The embodiment of the energizing system 100 shown in FIG. 2 is a particular implementation of the energizing system 100 of FIG. 1, so the explanations given above apply equally to the energizing system 100 of FIG. 2. As shown, the first switch 10 includes three switches, one for each phase of the three phase AC electric power. In the embodiment of FIG. 2, the reactive power compensation unit 50 includes the first reactive power compensator 51 and the second reactive power compensator 52.

The first reactive power compensator 51 includes a first inductance L1, a second inductance L2, and a first resistance R1. These components are provided for each phase of the power system, so that in sum, six inductances and three resistances are provided. The first inductance L1, the second inductance L2 and the first resistance R1 are connected in parallel, and the first inductance L1, the second inductance L2, and the first resistance R1 are connectable in parallel to the first switch 10 by the second and third switches 20, 30.

To enable a stepwise energization of the power transmission cable 60, the third switch 30 includes a switch SL1 for switching the inductance L1, a switch SL2 for switching the inductance L2, and a switch SR1 for switching the resistance R1. Accordingly, the three components of the reactive power compensator 51 may be individually switched in parallel to the first switch 10 for bypassing the first switch 10 during a start-up phase of the power system. The switches SL1, SL2 and SR1 of the third switch 30 may be switched sequentially in order to enable the stepwise energization of power transmission cable 60. The switches SL1, SL2 and SR1 are provided for each phase of the power system, thus giving a total number of nine switches.

A similar configuration may be achieved by providing these nine switches within the second switch 20, and by having only a single switch (e.g., one for each phase) within the switch 30 for the reactive power compensator 51.

As mentioned above, for energization of the power transmission cable 60, the second and the third switches 20, 30 are closed. In normal operation, the second switch 20 is opened, so as to enable the operation of reactive power compensator 51 for reactive power compensation. For this purpose, a fourth switch 40 is provided. When the fourth switch 40 is closed, the three phases that are open upon opening a second switch 20 are connected in a star configuration, thus enabling the operation of reactive power compensator 51. In other configurations, switch 40 may provide a delta connection of the three phases. The first reactive power compensator 51 may thus both operate for VAR compensation and for limiting inrush currents during the start-up phase.

The second reactive power compensator 52 is a static VAR compensator. The SVC 52 may, for example, include thyristor controlled reactors including inductances, thyristor switched capacitors, harmonic filters, and the like. Since the reactive load of the power transmission cable 60 is capacitive, the SVC 52 will primarily include thyristor controlled reactors.

For example, the second reactive power compensator 52 may by a static synchronous compensator (STATCOM), which includes a power electronic based voltage source converter. Effectively, such STATCOM may be considered to be a voltage source converter (VSC) that includes a voltage source that is connected behind a reactor. The voltage source may, for example, be a DC capacitor, as indicated in FIG. 2. In general operation, the provision of active power by such compensator is limited due to the limited capacity of the DC capacitor. The STATCOM may generate or consume reactive power, and The STATCOM may include Insulated Gate Bipolar Transistors (IGBTs) for switching. A fast and efficient reactive power compensation may be achieved by such reactive power compensator 52.

In order to use such static synchronous compensator 52 for energizing the power transmission cable 60, the reactive power compensation unit 50 further includes an AC/DC rectifier 53. The AC side of the rectifier 53 is connected via the third switch 30 to the power source 61, while the DC side of rectifier 53 is connected to the DC side of the second reactive power compensator 52 (e.g., across the DC capacitor thereof). Accordingly, when the third switch 30 is closed, the second reactive power compensator 52 may generate active power via the rectifier 53, and may thus be used for energizing the power transmission cable 60. Similar to the first reactive power compensator 51, the second reactive power compensator 52 may thus be connected in parallel to the first switch 10 via the second and third switches 20, 30 and may thus bypass the first switch 10 during a start-up phase of the power system. The static synchronous compensator may thus be used both for a fast and efficient VAR compensation and for energizing the power transmission cable 60 in the start-up phase.

The energizing system 100 may include only one of the first or second reactive power compensators 51, 52, or the energizing system 100 may include both. The particular setup will generally depend on the requirements for reactive power compensation, which are determined by the reactive power generated by the power transmission cable 60 and/or the load(s) connected thereto. Also, both reactive power compensators 51, 52 may be used for a stepwise energization of power transmission cable 60 (e.g., by first switching one parallel to the first switch 10 and then subsequently switching the other one additionally in parallel to the first switch 10).

For enabling such switching, the second switch 20 may, for example, include switches 21 for switching the first reactive power compensator 51 and switches 22 for switching the second reactive power compensator 52. Similarly, the third switch 30 may include the switches SL1, SL2, SL1 for the first reactive power compensator 51 and the switches SV for the second reactive power compensator 52. In consequence, for the three phase system, the second switch 20 may include six switches, whereas the third switch 30 may include twelve switches.

FIGS. 3A to 3E are schematic block diagrams illustrating a switching sequence for energizing the power transmission cable 60. The energizing system 100 of FIGS. 3A to 3E has a reactive power compensation unit including a reactive power compensator 51, as illustrated in FIG. 2. Although only a single electric phase is shown, the system may be a three phase system. The energizing system 100 may be configured as described above with respect to FIG. 1 or 2.

Figure 3A:
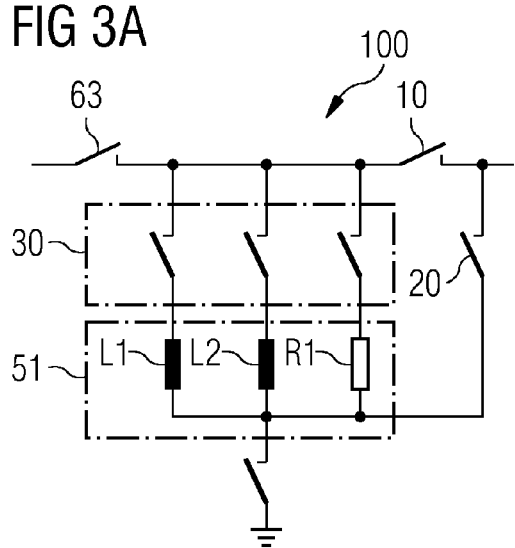
FIGS. 3A-3E are schematic diagrams showing a sequence of switching for an energizing system according to an embodiment.
Figure 3B:
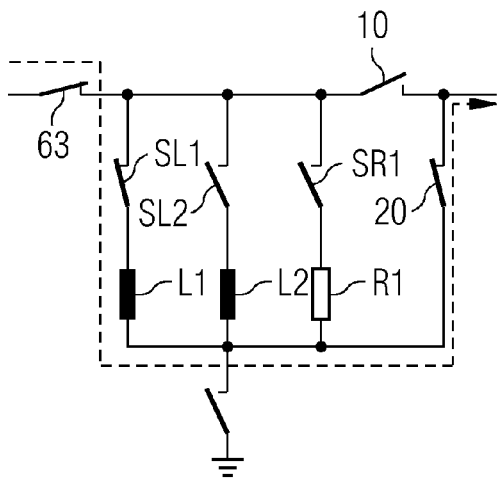
Figure 3C:
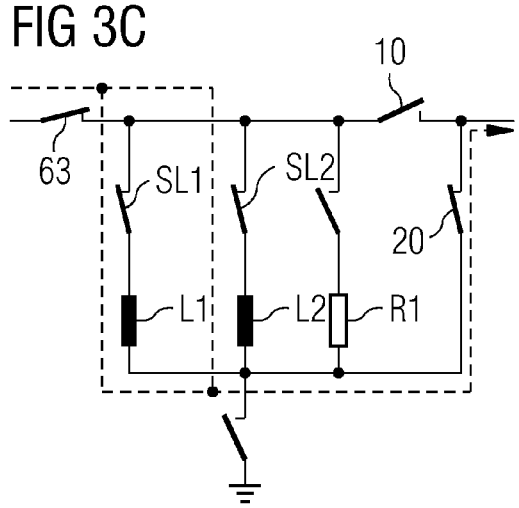

The switching sequence is illustrated in the flow diagram of FIG. 4. In act 101, the power transmission cable 60 is disconnected from the power source 61, and the first switch 10 is open. This is illustrated in FIG. 3A, which shows that also the second switch 20 and the third switch 30 are open. Also, if an additional circuit breaker 63 is provided (e.g., for protection of the power source in case of a short circuit or there like), this may also be open.

In act 102, the second switch 20 is closed. If provided, the additional switch or circuit breaker 63 is also closed. For stepwise increasing, the current fed into the power transmission cable 60, the switch SL1 of the third switch 30 is now closed in act 103 (see FIG. 3B). As visible in FIG. 3B, the first switch 10 is now bypassed via the switch SL1, the first inductance L1 and the second switch 20. To further increase the current supplied to the power transmission cable 60, the switch SL2 of the third switch 30 is now closed in act 104. This is all illustrated in FIG. 3C. Since the first and second inductances L1, L2 are now connected in parallel between the power source 61 and the power transmission cable 60, current flows through both inductors, as indicated by the dashed line in FIG. 3C, thus increasing the current in power transmission cable 60.

Figure 3D:
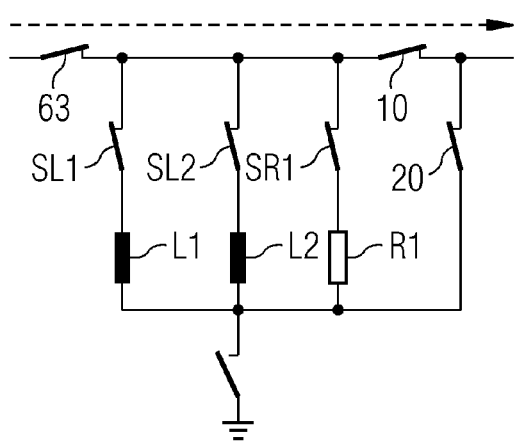

In act 105, the switch SL1 of the third switch 30 is closed. A certain amount of time after initiating the start-up procedure, the power transmission cable 60 is fully energized (act 106), so that the first switch 10 may be closed (act 107). This is illustrated in FIG. 3D, where the dashed line indicates the direct flow of current between the power source and the power transmission cable.

Figure 3E:
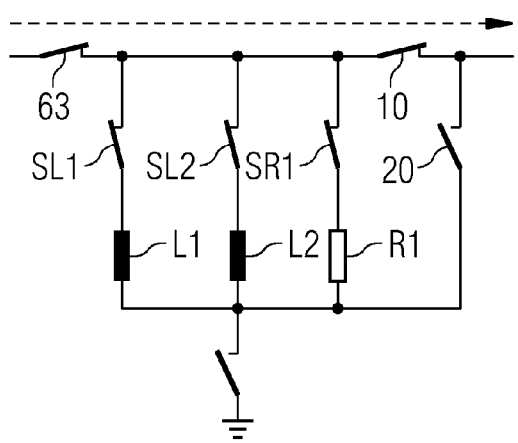

In act 108, the second switch 20 is now opened (see FIG. 3E). The reactive power compensator 51 is now no longer connected in parallel to the first switch 10, but the reactive power compensator 51 is connected across the three phases in parallel to the power transmission cable 60 and/or the load 62. The reactive power compensator 51 is thus now operative to compensate reactive power generated by the power transmission cable 60 and/or the load 62. If the configuration of the reactive power compensator 51 is similar to the one illustrated in FIG. 2, the switch 40 may be closed for reactive power compensation.

The method may be performed correspondingly if instead of the first reactive power compensator 51, the second reactive power compensator 52 is used, or if both reactive power compensators are used together. The second switch 20 and the third switch 30 are exchangeable (e.g., either switch may include the switches SL1, SL2 and SR1 for individually switching the inductances and the resistance). Acts of the method illustrated in FIG. 4 may be performed simultaneously or in a different order; acts 102 and 103 may, for example, be performed simultaneously, while act 106 is realized by the acts 102 to 105 and will thus be performed simultaneously to these acts.

In summary, embodiments of the method make use of a reactive power compensator for limiting the inrush currents when energizing a power transmission cable, which may be included in an umbilical or may be a subsea power cable. Inrush currents into connected equipment are thus also limited, such as into subsea devices (e.g., a subsea transformer connected to the power transmission cable). Overvoltages, reflections and oscillations may be reduced. The power transmission cable and the connected equipment may thus be specified for lower over-voltage capability, resulting in more compact and less costly components. Furthermore, the start-up sequence of one or more of the present embodiments reduces the stress on these components. At the same time, the complexity of the system may be kept relatively low, making the energizing system cost efficient and reliable. Configurations with passive components for reactive power compensation as well as the use of active components (e.g., in a static synchronous compensator) may be realized.

While specific embodiments are disclosed herein, various changes and modifications may be made without departing from the scope of the invention. The present embodiments are to be considered in all respects as illustrative and nonrestrictive, and all changes coming within the meaning and equivalency range of the appended claims are intended to be embraced therein.

The invention claimed is:

1. An energizing system for energizing an electric power transmission cable having an input side coupled to an electric power source and an output side coupled to a load, the energizing system comprising:
   a first switch connected between the electric power source and the input side of the electric power transmission cable, the first switch being switchable to connect and disconnect the electric power source from the electric power transmission cable;
   a reactive power compensation unit for compensating reactive power generated by the electric power transmission cable, the load, or a combination thereof, the reactive power compensation unit being coupled to the input side of the electric power transmission cable;
   a second switch connected between the input side of the electric power transmission cable and the reactive power compensation unit; and
   a third switch connected between the electric power source and the reactive power compensation unit,
   wherein the second switch and the third switch are connected such that by closing the second switch and the third switch, the reactive power compensation unit is connected in series with the electric power transmission cable and is connected in parallel to the first switch, so that when the first switch is opened, the power transmission cable is energizable via the third switch, the reactive power compensation unit, and the second switch.

2. The energizing system of claim 1, wherein the second switch or the third switch is switchable to connect the reactive power compensation unit parallel to the load for compensating reactive power in operation.

3. The energizing system of claim 1, wherein the reactive power compensation unit includes a reactive power compensator, the reactive power compensator comprising at least an inductance and a resistance connected in parallel between the third switch and the second switch, the power transmission cable being energizable via the inductance and the resistance.

4. The energizing system of claim 3, wherein the reactive power compensator comprises a first inductance, a second inductance, and a resistance connected in parallel between the third switch and the second switch.

5. The energizing system of claim 3, wherein the second switch or the third switch comprises a switch for each inductance and a switch for the resistance, so that the inductance and the resistance are independently connectable between the power source and the power transmission cable by the second switch or the third switch.

6. The energizing system of claim 1, wherein the energizing system is a three phase system, the electric power transmission cable being configured to transmit three phase electric power, the reactive power compensation unit being a three phase reactive power compensation unit.

7. The energizing system of claim 6, wherein each of the first switch, the second switch, and the third switch comprises a switch for each phase of the electric power.

8. The energizing system of claim 6, wherein the second switch or the third switch is switchable to connect the reactive power compensation unit parallel to the load for compensating reactive power in operation while the other of the second switch or the third switch remains open, the energizing system further comprising a fourth switch connected to a side of the three phase reactive power compensation unit at which the second switch or the third switch remains open during reactive power compensation, the fourth switch being switchable to connect the three phases into a star or delta configuration.

9. The energizing system of claim 1, wherein the reactive power compensation unit comprises a VAR compensator.

10. The energizing system of claim 9, wherein the VAR compensator is, via the second switch, connectable in parallel to the load for compensating reactive power, the reactive power compensation unit further comprising a rectifier connectable via the third switch to the electric power source, the VAR compensator having a DC side connected to an output of the rectifier.

11. The energizing system of claim 1, wherein the reactive power compensation unit comprises a first reactive power compensator and a second reactive power compensator, the second switch and the third switch comprising switches operable to independently connect or disconnect the first reactive power compensator and the second reactive power compensator in parallel to the first switch.

12. The energizing system of claim 11, wherein the first reactive power compensator comprises at least a first inductance, a second inductance and a resistance connected in parallel, and
   wherein the second reactive power compensator comprises a static synchronous compensator.

13. A subsea power system comprising:
   a topside power source;
   a subsea transformer;
   a power transmission cable electrically connecting the topside power source to the subsea transformer, the power transmission cable having an input side coupled to topside power source and an output side coupled to a load; and
   an energizing system for energizing the power transmission cable upon start-up of the subsea power system, the energizing system comprising:
      a first switch connected between the electric power source and the input side of the electric power transmission cable, the first switch being switchable to connect and disconnect the electric power source from the electric power transmission cable;
      a reactive power compensation unit for compensating reactive power generated by the electric power transmission cable or the load, the reactive power compensation unit being coupled to the input side of the electric power transmission cable;
      a second switch connected between the input side of the electric power transmission cable and the reactive power compensation unit; and
      a third switch connected between the electric power source and the reactive power compensation unit,
      wherein the second switch and the third switch are connected such that by closing the second switch and the third switch, the reactive power compensation unit is connected in series with the electric power transmission cable and is connected in parallel to the first switch, so that when the first switch is opened, the power transmission cable is energizable via the third switch, the reactive power compensation unit, and the second switch.

14. A method of energizing an electric power transmission cable using an energizing system, the electric power transmission cable having an input side coupled to an electric power source and an output side coupled to a load, the energizing system comprising a first switch connected between the electric power source and the input side of the electric power transmission cable, and a reactive power compensation unit for compensating reactive power generated by the electric power transmission cable, the load, or a combination thereof, the reactive power compensation unit being coupled to the input side of the electric power transmission cable, the energizing system further comprising a second switch connected between the input side of the electric power transmission cable and the reactive power compensation unit, and a third switch connected between the electric power source and the reactive power compensation unit, the method comprising:

operating the first switch in an open position;

closing the second switch and the third switch, thereby connecting the reactive power compensation unit in parallel to the first switch so as to bypass the open first switch;

energizing the electric power transmission cable through the reactive power compensation unit;

closing the first switch;

opening the second switch or the third switch; and operating the reactive power compensation unit so as to compensate reactive power generated by the electric power transmission cable or the load.

15. The method of claim 14, wherein the reactive power compensation unit includes at least a first reactive power compensator, the first reactive power compensator comprising at least one inductance and a resistance, the third switch comprising switches for independently switching each of the at least one inductance and the resistance, wherein closing the second switch and the third switch comprises:

closing the second switch;

closing a switch of the third switch that is connected to the at least one inductance so as to connect the at least one inductance in parallel to the first switch, and after a predetermined amount of time, closing another switch of the third switch that is connected to the resistance so as to connect the resistance in parallel with the first switch.

16. The energizing system of claim 3, wherein the inductance comprises a coil.

17. The energizing system of claim 9, wherein the VAR compensator comprises a static VAR compensator or a static synchronous compensator.

18. The subsea power system of claim 13, wherein the second switch or the third switch is switchable to connect the reactive power compensation unit parallel to the load for compensating reactive power in operation.

19. The subsea power system of claim 13, wherein the reactive power compensation unit includes a reactive power compensator, the reactive power compensator comprising at least an inductance and a resistance connected in parallel between the third switch and the second switch, the power transmission cable being energizable via the inductance and the resistance.

20. The subsea power system of claim 19, wherein the reactive power compensator comprises a first inductance, a second inductance, and a resistance connected in parallel between the third switch and the second switch.

\* \* \* \* \*